United States Patent [19]

Sprado

[11] 4,035,075
[45] July 12, 1977

[54] IMAGE SCANNING SYSTEM FOR COPY MACHINES

[75] Inventor: Charles G. Sprado, White Bear Lake, Minn.

[73] Assignee: Minnesota Mining and Manufacturing Company, St. Paul, Minn.

[21] Appl. No.: 635,693

[22] Filed: Nov. 26, 1975

[51] Int. Cl.² .................................. G03B 27/70
[52] U.S. Cl. ................................ 355/66; 355/8
[58] Field of Search ............ 355/57, 65, 47, 49, 355/66, 8

[56] References Cited

U.S. PATENT DOCUMENTS

| 3,330,181 | 7/1967 | Jakobson | 355/66 X |
| 3,431,053 | 3/1969 | Wick et al. | 355/66 |
| 3,612,679 | 10/1971 | Punnett | 355/8 |
| 3,614,222 | 10/1971 | Post et al. | 355/8 |
| 3,697,165 | 10/1972 | Morriston et al. | 355/8 |
| 3,832,057 | 8/1974 | Shogren | 355/8 |
| 3,858,976 | 1/1975 | Brooke | 355/66 |
| 3,884,574 | 5/1975 | Dol et al. | 355/66 |

Primary Examiner—Donald A. Griffin
Attorney, Agent, or Firm—Cruzan Alexander; Donald M. Sell; John C. Barnes

[57] ABSTRACT

The apparatus disclosed herein is a copy machine wherein a document may be supported on a fixed plane and the image thereon scanned by a scanning mirror arranged to sweep past the document and by the use of a series of mirrors will position the image on a drum rotated on an axis parallel to the direction of movement of the scanning mirrors. This scanning system utilized a first and a second carriage which are moved relative to each other and are driven by a cam and linkage affording initially movement of the mirrors from a home position across the scanning area to a start position to begin the scanning mode at uniform speed, said cam affording continuous controlled acceleration, velocity and displacement of the scanning mirrors.

11 Claims, 8 Drawing Figures

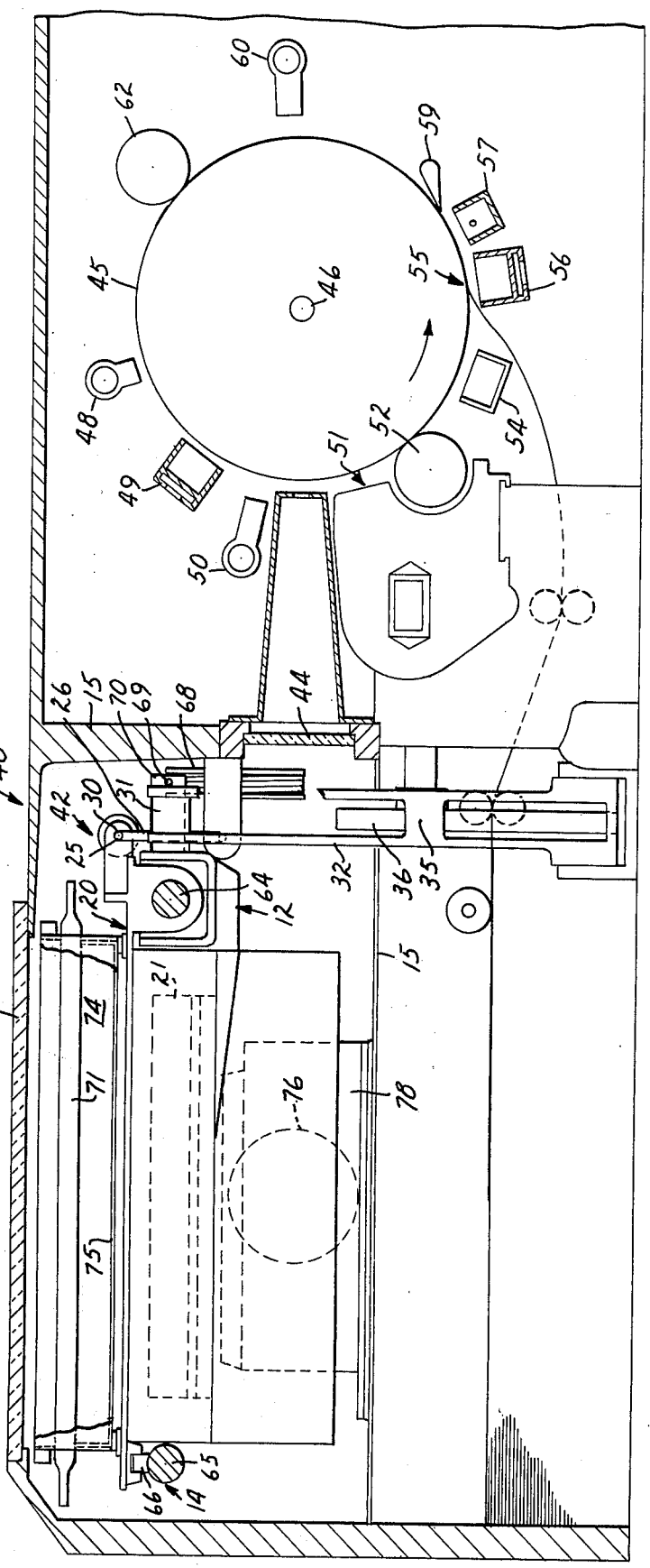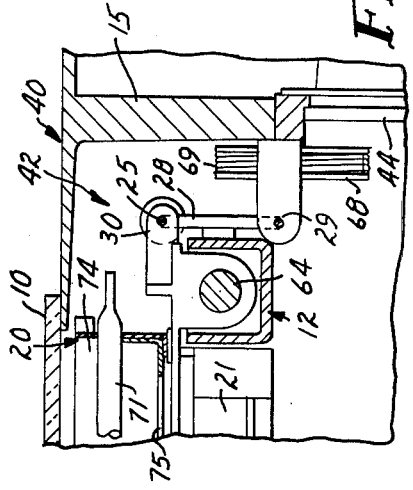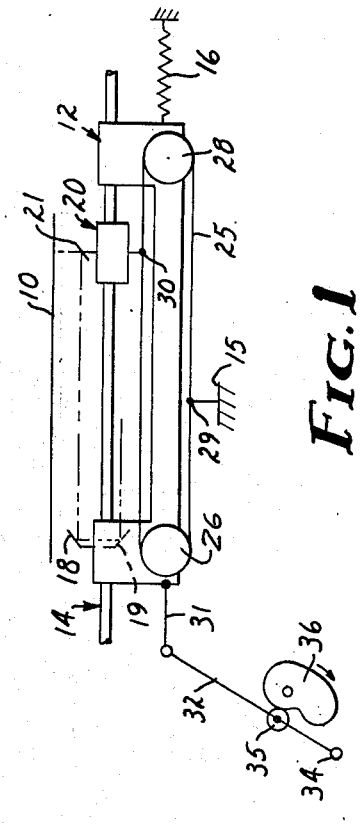

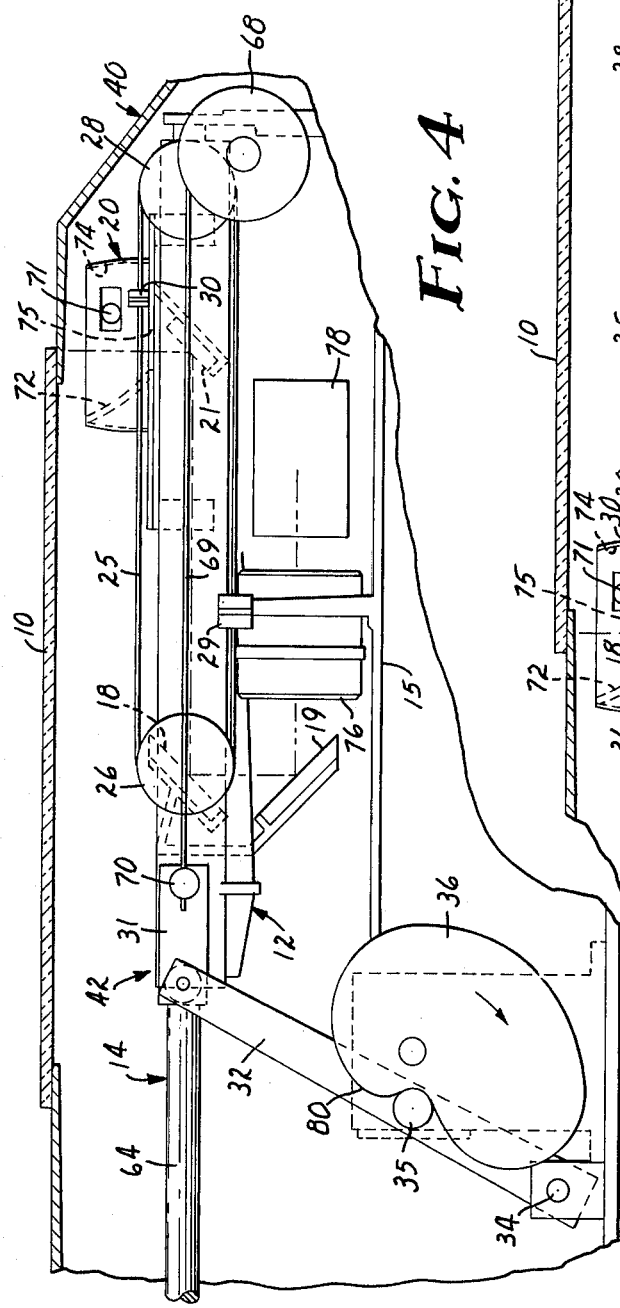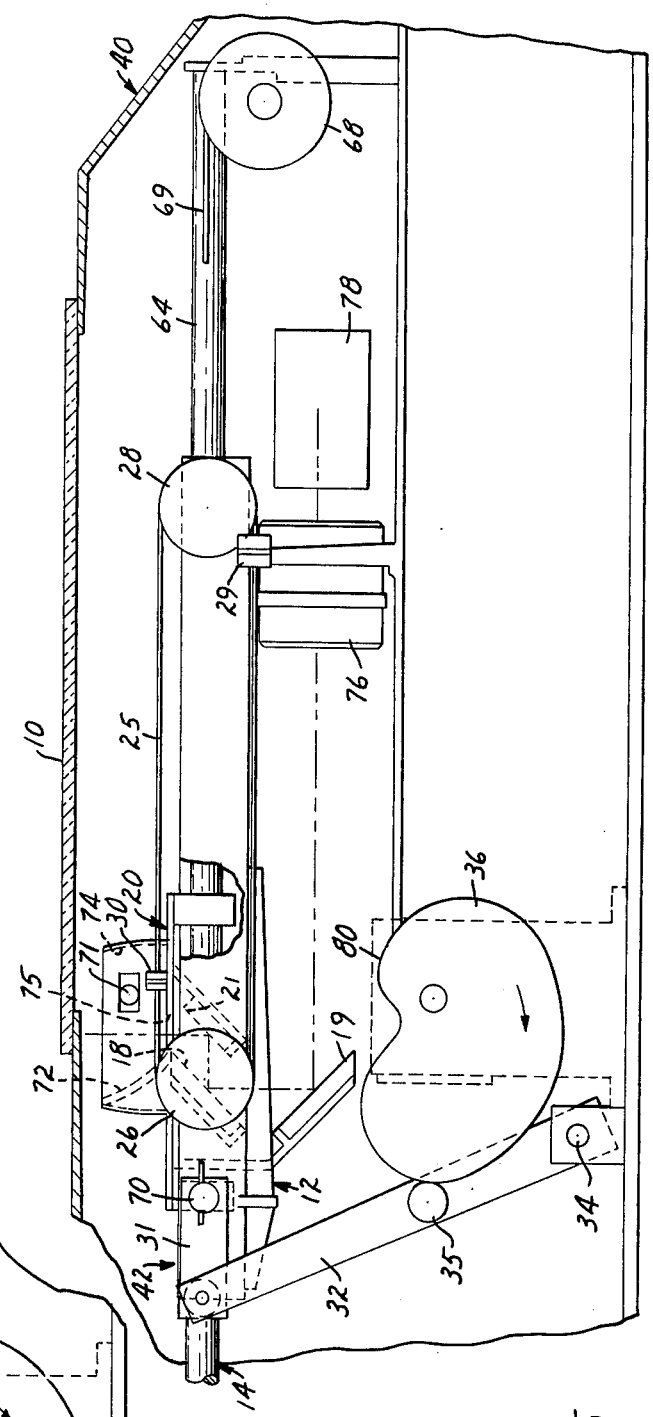

IMAGE SCANNING SYSTEM FOR COPY MACHINES

BACKGROUND OF THE INVENTION

1. Field of the Invention

This invention relates to an improvement in a scanning system for use with reproducing machines and in one aspect to an improvement in the drive for scanning carriages affording minimal shock to the machine during total scanning cycle.

2. Description of the Prior Art

This invention refers to an improvement in scanning exposure systems. It is common in optical copying of documents that the subject is placed on a stationary optical exposure support and the optical exposure device includes a lens by which an image is transferred to the copy material along a ray path. This is commonly done by moving an exposure light source and a series of mirrors on a carriage past the orginal. Then, successive incremental regions from the document to be copied are imaged onto the image-receiving member by the mirrors and a lens. This scanning technique has been utilized to reduce the size of the machine and to permit the use of a less expensive objective lens than a machine which exposes the entire original onto the receptor simultaneously.

Prior known systems for scanning the original document by the use of a pair of relatively movable carriages supporting mirrors for transferring the successive images include U.S. Pat. No. 3,330,181, issued July 11, 1967 to H. Jakobson; U.S. Pat. No. 3,431,053, issued Mar. 4, 1969 to R. Wick et al; U.S. Pat. No. 3,832,057, issued Aug. 27, 1974 to D. K. Shogren; and U.S. Pat. No. 3,858,976, issued Jan. 7, 1975 to E. R. Brooke.

The devices disclosed in these patents have similar arrangements comprising a first carriage for the illuminating device, a mirror and the exposure aperture and a second carriage movable relative to the first and carrying a mirror or mirrors for directing an image to an objective lens. The two carriages are relatively movable so that, on movement of one, the other moves half the distance travelled by the first but in the same direction. This ensures that the optical path from the original to the lens is always the same length regardless of the position of the part with the slot shaped exposure aperture. These prior devices utilize complex drive systems such as catch release mechanisms, contoured cable wind-up pulleys, dash pots, and other systems to move the carriages relative to the lens. Typical also, when the carriages have moved past the document support surface to project the image therefrom to the image receiving surface of the copying apparatus, the carriage is automatically returned to the starting position so that the apparatus is ready to make the next copy. These return movements of the carriages are generally made by the force of a spring which rapidly drives the carriage back to the start position. These mechanisms and systems have provided inadequate control resulting in high random acceleration levels, undesirable vibrations, and noise. These systems generally require more components and have not had the reliability required. Therefore, these problems have been reviewed and the present invention is believed to solve the shock, vibration, noise and reliability problems.

The present invention simplifies the drive system for a scanning exposure device. The present invention utilizes a drive system which by its nature removes shock due to uncontrolled acceleration or deceleration of the movable elements.

The drive system of the present invention utilizes a cam and linkage drive to the principal carriage such that the acceleration, velocity and displacement of the movable carriages are continuously controlled. The only other presently known cam drive for a scanning exposure device is U.S. Pat. No. 3,612,679, issued Oct. 12, 1971 to F. D. Punnett et al. In this patent the exposure device comprises an aperture and illuminating device movable across the optical exposure support and a lens is movably supported intermediate the scanning apparatus and the image-receiving member and movable relative thereto to project the sequential images onto the image-receiving member.

In the scanning system of this patent it is necessary to have a straight optical path necessitating an enlarged machine and it is necessary that the lens support, during its movement, be free of any vibrations to have good resolution of the projected image on the image receptor of the copying apparatus. Further, this patent teaches the desirability of the rapid return of the scanning members to the start position upon completion of the scanning mode which is accomplished through spring 75 and the relationship of the follower 74 on the cam 73.

Therefore, the prior art sets forth numerous ways of functionally providing for the scan exposure of a photoconductive surface or other image receptor but the solution to the problems encountered by these devices have previously continued unattended.

SUMMARY OF THE PRESENT INVENTION

The present invention provides an improved copying apparatus having a support for the subject to be copied, a scanning device for imparting an image therefrom unto an image receptor, and an improved drive for the image scanning device such that the acceleration, velocity and displacement of the movable elements are continuously controlled.

The scanning device comprises a first driven carriage moving smoothly over a path of travel parallel to the support for the document to be copied. A second carriage is supported for movement relative to the first carriage and it supports an illuminating device. The carriages are interconnected such that the rate of movement of the second carriage is twice that of the first carriage upon movement of the first carriage in a predetermined direction. Spring means are connected to the first carriage for urging the same in a first direction. The drive means for the carriages is such that the acceleration, velocity and displacement of the members is controlled continuously. The drive means comprises a driven cam having a profile such that the carriages are driven to the scanning position at a very high velocity in order to leave as much time as possible for the scan mode of the scanning cycle, at a constant velocity during the scan mode of the cycle, and deceleration with constant control to reduce vibrations and shocks. The linkages are constantly loaded by a spring against the cam, and the cam provides for positive control of the cam follower at all times.

BRIEF DESCRIPTION OF THE DRAWING

The present invention will be more fully described hereinbelow with reference to the attached drawing wherein:

FIG. 1 is a schematic diagram of the image scanning device and drive therefore;

FIG. 2 is a fragmentary transverse vertical section of a copying apparatus constructed according to the present invention;

FIG. 3 is a detail, transverse vertical sectional view;

FIG. 4 and FIG. 5 are vertical longitudinal sectional views illustrating the scanning apparatus constructed according to the present invention in two different positions during a scanning cycle;

DETAILED DESCRIPTION OF THE PREFERRED EMBODIMENT

Figure 6:
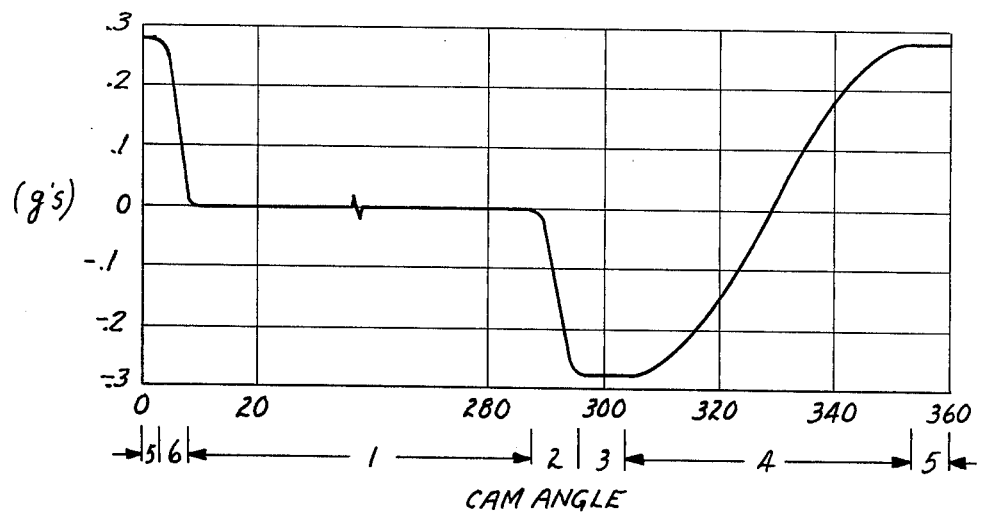
FIG. 6 is an acceleration profile of a cam design utilized in the device according to the present invention.

The present invention relates to an improvement in a copying apparatus wherein an original document or the subject to be copied is placed on a stationary optical exposure support and the subject is illuminated affording an image thereof to be transferred onto an image-receiving member which is generally a light-sensitive member such as a layer of photo-conductive material supported on a rotatable drum. The image is then developed on this drum electrographically and the image forming powders are then transferred from the drum to a receptor sheet.

In the exposure device for such a copying apparatus various forms have been utilized and the present invention relates to an improved form of exposure device which also lends itself to a variation in the total copying machine design.

Referring first to FIG. 1, which schematically ilustrates the exposure device for a copying apparatus, there is shown a stationary optical exposure support 10 which is generally a transparent glass plate upon which the document or subject to be copied may be placed. Beneath this support 10 is the scanning apparatus. This scanning apparatus comprises a first carriage 12 which is the half-speed carriage and is moved along fixed guide means 14 relative to a fixed frame 15 against the bias of a spring 16. This first carriage 12 carries a pair of perpendicularly positioned mirrors 18 and 19. A second carriage 20 is carried on the guide means 14 and is referred to as the fast carriage and has relative movement with respect to the first carriage 12. The second carriage carries a mirror 21 which scans the support 10 through an expoure aperture to direct successive images therefrom to the mirror 18 which reflects the same to the mirror 19 which reflects the image to a further mirror (to be hereinafter described) which directs the image onto the image-receiving surface.

The first carriage and the second carriage are connected by a cable 25 disposed around a pair of pulleys 26 and 28 fixed to the first carriage. Cable 25 is connected at one point to an anchor 29 fixed to the frame 15 and the cable 25 is fixed to the carriage 20 at a point 30.

Connected to the carriage 12 is a first pivoted link 31 which is connected at one end to an end of a lever 32 pivotally connected to the frame 15 at point 34. A cam follower 35 is connected intermediate the ends of the lever 32 and engages the cam surface of a rotatable cam 36 driven in a clockwise direction as illustrated in FIGS. 1, 4, and 5 of this drawing.

As illustrated in FIG. 1, the cam follower 35 is sitting on the cam surface of the cam 36 such that upon initial rotation of the cam 36 the carriage 12 will be moved toward the right under the bias of spring 16 as the cam follower moves into the recessed area in the cam surface. The carriage will then stop and be moved very rapidly at peak acceleration to the left. The carriage will then be stopped, and returned to the right. It will first be brought up to a predetermined velocity, and will begin the scan mode of the cycle and move at a continuous velocity to move the carriage 20 across the optical exposure support 10 at a uniform velocity and then stop the carriages 12 and 20. The stop or home position being on a surface of the cam 36 spaced from the recess or surface on the cam closest to the axis of rotation of the cam 36. During movement of the carriage 12 under the control of the lever 32 and link 31 the carriage 20 is moved relative to the carriage 12 by the cable 25.

Referring now to the other figures, wherein all similar elements are identified by the same reference numeral, it will be seen that the copying apparatus, generally designated by the reference numeral 40, has a frame 15 including the optical exposure support 10, and providing support for a scanning mechanism, as above-described, and generally designated 42, for projecting successive images of a subject on the support 10 through a clear window 44 onto the coated surface of a synchronously-driven drum 45. The drum 45 may be provided with a photoconductive layer to receive the light images for electrographically producing a reproduction of the image.

The drum 45 is synchronously driven about an axis 46 which is parallel to the direction of movement of the scanning carriages 12 and 20 of the scanning device 42. As the drum rotates upon its axis 46 by a suitable drive means (not shown) its surface passes through successive processing stations. For the purposes of this disclosure the elements disposed about the drum surface are described functionally only. Proceeding from the upper portion of the drum, as shown in FIG. 2, counterclockwise the first element is a lamp 48 for initially conditioning the photoconductor, the second element is a charge corona 49 which places a uniform electrostatic charge on the photoconductive layer of the drum 45. A washout lamp 50 exposes the photoconductive layer between copying cycles to wash the portions of the photoconductor which are not used to make the same uniformly conductive. The drum then passes the exposure station where it is exposed to the light image passing through the window 44. The drum then moves past a developing station 51 wherein a suitable powder material such as toner is placed in contact with the drum surface by a roller 52 to develop the latent image thereon. The toner adheres to the drum surface in the configuration of the latent image, thereby developing the latent image. The drum then moves past a pretransfer corona 54 which serves to reduce the attractive force between the toner and the photoconductor. The drum then moves past the transfer station 55 where the drum surface is brought into contact with a receptor sheet such as paper, while a transfer corona 56 is energized. A further corona emitter 57 is positioned adjacent the path of the receptor sheet which with a stripper 59 serves to remove the receptor sheet from the drum surface. The drum then moves past a lamp 60 which again washes the drum surface with light and a cleaning wheel 62 to remove any toner remaining on the drum from that exposure.

The drive for the drum 45 and the cam operating the scanning device 42 is provided by a motor (not shown). The motor drives a gear box which in turn drives the cam 36 and the drum 45 synchronously.

Illustrated in FIGS. 2 and 3 the carriage 12 is supported for movement along guide 14 comprising two parallel rods 64 and 65 which are supported at their ends from the frame 15. The frame 12 fits about the shaft 64 at two longitudinally spaced points and the transversely spaced side of the frame 12 is formed with a support member 66 which rests on the top of the shaft 65. Pulleys 26 and 28 are supported from the carriage 12 and the cable 25 is positioned therearound between the anchor 29 to the frame 15 and to the attachment 30 connecting the cable 25 to the carriage 20.

The spring 16 is a recoil or torsion spring supported to drive a drum 68 about which a cable 69 is wound and the cable 69 is attached to the carriage 12 by a connecting pin 70.

The carriage 20 supports a lamp 71 for illuminating the optical exposure support and the subject thereon. The lamp is supported between two reflectors 72 and 74, and illuminates the subject. The frame of the carriage 20 is formed with a slot-shaped exposure aperture 75 below which is supported the mirror 21. The carriage 20 is supported for movement along the shafts 64 and 65 as illustrated in FIGS. 2, 3, and 5. The successive images received through the exposure aperture 75 by the mirror 21 are directed to the mirrors 18 and 19 and then to the projection lens positioned in the stationary lens barrel 76. From the projection lens the image is directed toward and reflected from a mirror 78 supported at 45° relative to the direction of movement of the carriages to direct the images through the window 44 onto the surface of the drum 45.

The carriage 12 is connected through the pivoted link 31 and lever 32 to the driving member therefor. The lever 32 is anchored to the frame at pivot 34 and the cam follower 35 is positioned to engage the surface of the rotating cam 36.

As shown in FIG. 4, the cam 36 has rotated in a clockwise direction from the home position about 30° and has now reached the position where further movement to the right is inhibited by the cam and further rotational movement will begin a rapid acceleration toward the left as the cam 36 continues to drive the follower 35. FIG. 5 illustrates the position of the carriages and of the lever 32 as the carriages begin to move at a uniform velocity beneath the optical exposure support 10 to start the scan mode. When the frame 20 has scanned the support the carriages are decelerated. When the cam again reaches the home position as indicated by the reference numeral 80, the drive to the cam will be discontinued, stopping the carriages. The scan mode will have been completed and the image projected to the drum. The position of the carriages with respect to the frame are registered in the timing control section of the copying apparatus 40 by means of switches positioned along the path of the carriage 12.

The cam 36 is profiled such that during the initial movement of the cam the carriages 12 and 20 are positioned as rapidly as possible to begin the scanning mode. For the scanning mode of the cycle, cam 36 is profiled to work in relation with the connecting linkages such that the carriages are driven at constant velocity. The cam follower 35 is loaded at all times against the cam 36 by the link 31 and lever 32 under the force of the spring winding reel 68.

The cam 36 is constructed from the following six segments: (1) constant velocity scan; (2) shifted cosine variation to peak deceleration; (3) constant deceleration; (4) cosine variations from peak deceleration to peak acceleration; (5) constant acceleration; (6) cosine variation from peak to 0 acceleration. The cam 36 is operated such that the cam follower passes through the cam segments in reverse order. The peak accelerations in segments 2 through 6 are equal in magnitude. The duration of segments 2 and 6 (8° and 5° respectively) provide smooth transitions between the scan segment and peak acceleration segments. The duration of segment 4 (50°) provides latitude between peak deceleration and peak acceleration at the startup of the scanning cycle to reduce the initial cam shaft torque. The durations of segments 3 and 5 provide suitable duration such that the sum of the segments equals 360°, and affords no net velocity change from the combination of segments 2 through 6. The acceleration profile is shown in FIG. 6 and the segmental areas are designated by number.

Figure 7:
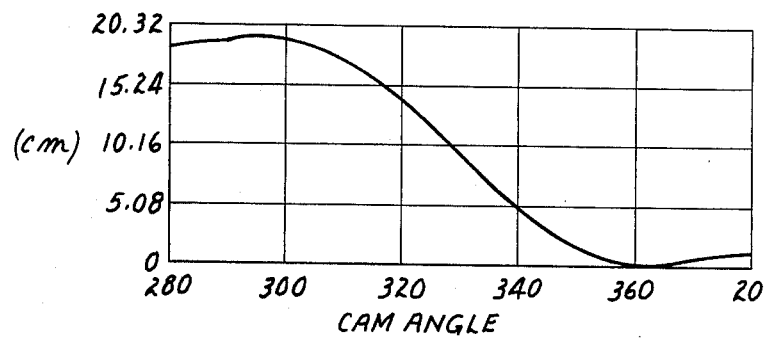
FIGS. 7 and 8 are cam profile curves illustrating displacement and velocity profiles for a portion of the cam.
Figure 8:
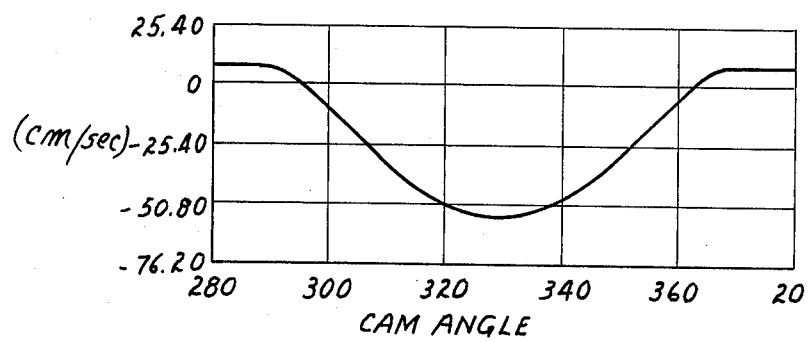

The cam profile curves for displacement and velocity of the optical scanner produced by the fast positioning of the scanner from the home position to the start scan mode position are given in the graphs shown in FIGS. 7 and 8 of the drawing. It is this portion of the cam profile which is particularly structured that smooth positive control over the movement of the carriages is achieved and any random acceleration levels, vibrations and noise are removed.

Having thus described the invention with reference to a preferred embodiment, it will be appreciated that modifications may be made without departing from the spirit of the invention as defined in the appended claims.

I claim:

1. In a copy machine, an apparatus for scanning a stationary supporting means on which an original may be placed to impart an image therefrom onto a moving image-receiving member including a frame, a first carriage supported by said frame to move along a path of travel parallel to said stationary supporting means, a second carriage supported for movement over a path of travel parallel to the path of said first carriage, means interconnecting the second carriage to the first carriage and to said frame to afford movement of said second carriage in the same direction but at a rate twice that of said first carriage upon movement of said first carriage in a predetermined direction, spring means connected to said first carriage for urging it in a first direction, linkage means connected to said first carriage for transferring forces to said first carriage to move it along its said path, and driven cam means for moving said linkage means to drive said first carriage along said path, said driven cam means having a profile affording continuously controlled acceleration, velocity and displacement of said first carriage and for affording a scan mode wherein said second carriage scans said supporting means at a constant velocity.

2. Apparatus according to claim 1 wherein said linkage means comprises a lever pivoted to said frame and a connecting link connected to said lever and to said first carriage, said lever supporting cam follower means intermediate its length for engagement with said cam means.

3. Apparatus according to claim 2 wherein siad first carriage is moved in said first direction during said scan mode.

4. Apparatus according to claim 1 wherein said first carriage is moved in said first direction during said scan mode.

5. In a document scanning apparatus for a copy machine including a support upon which an object may be placed and held in a fixed position, said scanning apparatus comprising
- a first carriage, said carriage supporting a pair of mirrors positioned angularly with respect to each other to reflect an image from one to the other and movable along a path parallel to said support,
- a second carriage arranged to move over a path of travel parallel to the path of travel of said first carriage and supporting a mirror for reflecting an image 90° from said support toward one of said mirrors on said first carriage,
- means interconnecting said first carriage to the second carriage and to an anchor fixed with respect to said support member affording relative movement between said carriages upon movement of said first carriage to move said second carriage in the same direction at substantially twice the speed of that of the first carriage,
- spring means urging said first carriage in a first direction,
- linkage means connected to said first carriage for moving said first and second carriage upon movement of said linkage means along said path, said linkage means comprising a pair of rigid links pivotally connected, one of said links pivotally connected to said carriage and one of said links being pivotally connected relative to said support, and
- cam means for pivoting said link connected to said support for driving said link and said first carriage, said cam having a surface affording a continuous controlled acceleration, velocity and displacement of said first carriage to restrict any shock loading to said support member upon said carriages accelerating or decelerating.

6. In a document scanning apparatus according to claim 5 wherein said cam means comprises a rotatable cam engageable with said link pivoted relative to said support to move said first carriage against said spring means to begin a scan mode and then at a constant velocity in said first direction during the scan mode and then stops the carriage.

7. In a document scanning apparatus according to claim 6 including
- a fixed lens to receive an image reflected from a mirror on said first carriage, and
- a fourth mirror positioned to receive an image from said lens and positioned oblique to said direction of movement of said carriages.

8. In a document scanning apparatus according to claim 7 wherein a drum is driven about an axis parallel to said first direction and having a surface to accept an image reflected from said fourth mirror.

9. In a document scanning apparatus according to claim 5 including
- a fixed lens to receive an image reflected from a mirror on said first carriage, and
- a fourth mirror positioned to receive an image from said lens and positioned oblique to said direction of movement of said carriages.

10. In a document scanning apparatus according to claim 5 wherein said cam comprises the following segments:
1. constant velocity scan;
2. peak deceleration;
3. peak deceleration to peak acceleration; and
4. peak to 0 acceleration.

11. In a copy machine, an apparatus for scanning a stationary supporting means on which an original may be placed to impart an image therefrom onto a moving image-receiving member rotatable about an axis including
- a frame,
- a first carriage supported by said frame to move along a path of travel parallel to said stationary supporting means and said axis of rotation of said image-receiving member,
- a second carriage supported for movement over a path of travel parallel to the path of said first carriage,
- means interconnecting the second carriage to the first carriage and to said frame to afford movement of said second carriage in the same direction but at a rate twice that of said first carriage upon movement of said first carriage in a predetermined direction,
- spring means connected to said first carriage for urging it in a first direction,
- a lever pivoted to said frame and supporting a cam follower intermediate its length,
- a connecting link connected to said lever and to said first carriage,
- driven cam means engageable with said cam follower for moving said lever and link to drive said first carriage along said path, said driven cam means having a profile affording continuously controlled acceleration, velocity and displacement of said first carriage and for affording a scan mode wherein said second carriage scans said supporting means at a constant velocity,
- said first carriage supporting a pair of mirrors positioned angularly with respect to each other to reflect an image from one to the other, said pair of mirrors being mounted oblique to said path and at an acute angle to said supporting member,
- said second carriage supporting a mirror at an acute angle to said supporting member for reflecting an image 90° from said supporting member toward said one of said pair of mirrors on said first carriage,
- a fixed lens positioned to receive an image reflected from said other of said pair of mirrors on said first carriage, and
- a fourth mirror positioned to receive an image from said lens and positioned oblique to said direction of movement of said carriages and perpendicular to said supporting means for directing an image received thereon to said image-receiving member.

* * * * *